(No Model.)
S. C. DARROW.
DEEP WATER FISHING TACKLE.
No. 481,165. Patented Aug. 23, 1892.
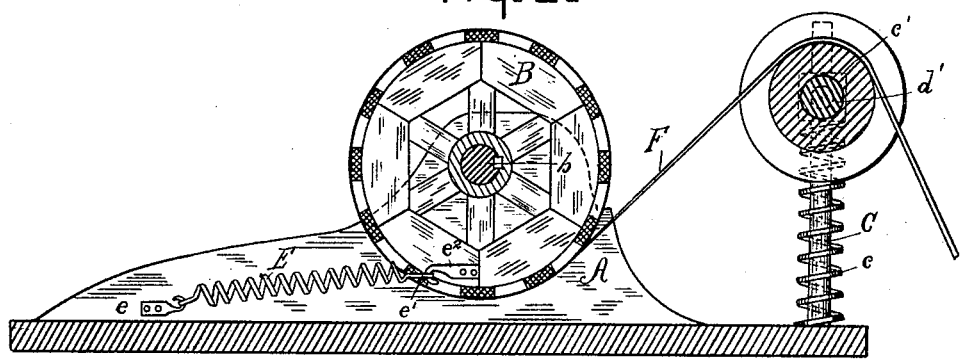
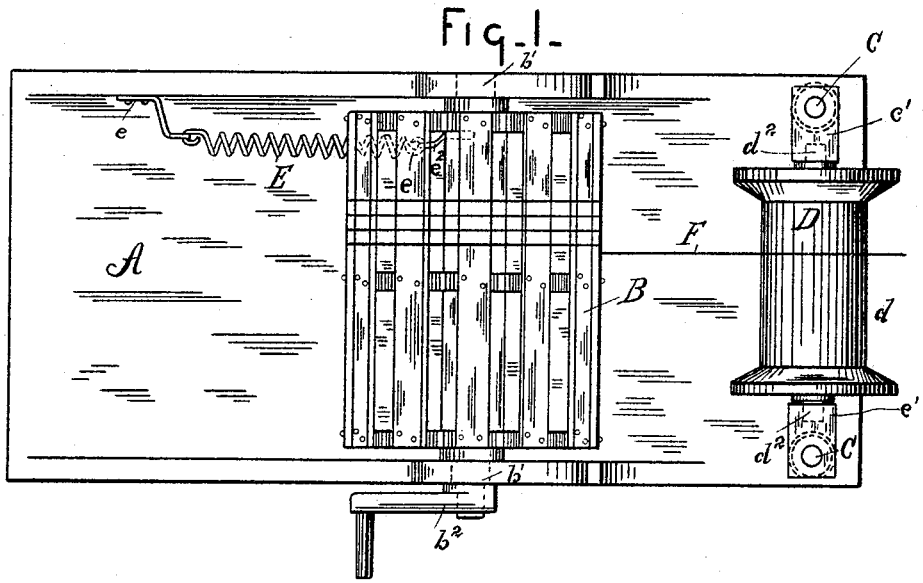
WITNESSES
F. Clough.
D. W. Bradford
INVENTOR
Samuel C. Darrow.
By Wells W. Leggett,
Attorney

UNITED STATES PATENT OFFICE.

SAMUEL C. DARROW, OF TRAVERSE CITY, MICHIGAN.

DEEP-WATER FISHING-TACKLE.

SPECIFICATION forming part of Letters Patent No. 481,165, dated August 23, 1892.

Application filed March 2, 1891. Serial No. 383,396. (No model.)

*To all whom it may concern:*

Be it known that I, SAMUEL C. DARROW, a citizen of the United States, residing at Traverse City, county of Grand Traverse, State of Michigan, have invented a certain new and useful Improvement in Deep-Water Fishing-Tackle; and I declare the following to be a full, clear, and exact description of the same, such as will enable others skilled in the art to which it pertains to make and use the same, reference being had to the accompanying drawings, which form a part of this specification.

It is well known among the fishermen of the great lakes that the fishing-lines in common use cannot be advantageously employed to take fish which are at a depth greater than fifty or seventy-five feet.

It is the object of my invention to produce a deep-water fishing-tackle comprising a fishing-line, in combination with a fishing-reel, by means of which tackle fish can be taken, the said fish being two hundred, five hundred, or even one thousand feet below the surface of the water and at a horizontal distance from the fisherman's boat of two hundred, five hundred, or even one thousand feet.

In the drawings, Figure 1 is a plan view of the device embodying my invention. Fig. 2 is a vertical sectional view of the same. Fig. 3 is a detail view of a wire line provided at the hook end with a section of ordinary fishing-line.

In my fishing-reel, A represents the frame.

B is the line-spool onto which the line is wound.

$b$ is the axle of the line-spool.

$b'$ represents the bearings of the said axle.

$b^2$ represents the actuating-crank, which engages with the said axle.

C represents upright posts fixed into the frame A.

$c$ represents spiral springs forming sleeves about the said posts.

$c'$ represents blocks fitting loosely about the posts C and the said blocks resting on the upper ends of the spiral springs $c$, and these spiral springs are adapted to yield according to the power vertically exerted upon the said blocks.

D represents the guide-spool. This spool is provided with the grooves $d$, in which the line is designed to rest. It is also provided with the axle $d'$ and with the bearing $d^2$ in the blocks $c'$.

E is an indicating spiral spring. This spring is fixed to the frame at $e$, and at the opposite end the said spring is provided with an eye $e'$.

$e^2$ is a hook fixed to the line-spool B. This hook is adapted to engage with the eye $e'$ of the indicating-spring. This indicating-spring E has three functions. It engages with the hook $e^2$ and prevents the line-spool from turning on its axis and thus running out line. It also indicates by giving or stretching more or less when the hook has become fast on a snag, whereas if the spring is not present many lines and hooks are lost, and the said spring also indicates at once when a fish has been hooked, and it thus informs the fisherman how to handle his line.

F represents the fishing-line, which is wound upon the spool B, the said line then running over the guide-spool D and then off into the water. This fishing-line is of wire, and the size of the wire may vary, according to the nature of the weather, the size of the fish to be caught, or the depth of the water. This wire line has many advantages over the line in ordinary use. The ordinary line cannot be used for trolling for fish which stay at a depth of two or three hundered feet unless the said line is so heavily weighted that the fisherman cannot tell when he has hooked a fish and so heavily weighted that he can scarcely control his boat. Moreover, when trolling with an ordinary line it takes about ten feet of line to get to a depth of one foot. Therefore it is impracticable to use the common line in water over fifty or seventy-five feet deep.

My wire line does not have to be weighted at all, and it therefore permits the boat to be handled at will. Since it is not weighted it readily transmits the bite of a fish to the indicating-spring, and since the wire line is heavy and offers very little resistance it only requires about four feet of line to get to a depth of one foot when trolling.

The operation of my reel is as follows: When a fish is hooked and it makes a run with the hook, considerable strain is brought to bear upon the line. This strain coming on the guide-spool D, and, being transmitted to the blocks c', the springs c give sufficiently to prevent the line or hook from being broken and also to prevent the fish from tearing itself loose. As soon as the fish is hooked the indicating-spring E is stretched out by the pull of the fish, and the fisherman is thus notified of its presence. By turning the actuating-crank $d^2$ the indicating-spring is unhooked from the line-spool, when the fish may be reeled in.

While not at all necessary, I prefer to have eight or ten feet of common fishing-line attached to the hook end of my wire line, and to this common fishing-line I attach the hook. This common fishing-line at the end adapts the line when the fish is reeled in to be handled with greater ease.

What I claim is—

1. In a fishing-reel, the combination of a frame, a line-spool mounted in said frame, a guide-spool rotatably mounted in vertically-movable supports, and a spring for maintaining said guide-spool in an elevated position, substantially as described.

2. In a fishing-tackle, the combination of a frame, a line-spool mounted on said frame, means for rotating said spool, a catch upon said spool, a spring adapted to engage in said catch, and a guide-spool adapted to engage the line rotatably mounted in vertically-movable supports, and a spring for maintaining said guide-spool in an elevated position against the strain on the line, substantially as described.

In testimony whereof I sign this specification in the presence of two witnesses.

SAMUEL C. DARROW.

Witnesses:
   JAS. R. ADRIT,
   LORIN ROBERTS.